United States Patent
Oishi et al.

(10) Patent No.: US 8,224,262 B2
(45) Date of Patent: Jul. 17, 2012

(54) IDENTIFICATION INFORMATION READER AND PRINTER INCLUDING THE SAME

(75) Inventors: Sadatoshi Oishi, Fuji (JP); Nobuo Murofushi, Susono (JP)

(73) Assignee: Toshiba Tec Kabushiki Kaisha (JP)

( * ) Notice: Subject to any disclaimer, the term of this patent is extended or adjusted under 35 U.S.C. 154(b) by 0 days.

(21) Appl. No.: 13/044,967

(22) Filed: Mar. 10, 2011

(65) Prior Publication Data

US 2011/0216365 A1 Sep. 8, 2011

Related U.S. Application Data

(62) Division of application No. 11/706,052, filed on Feb. 14, 2007, now Pat. No. 7,929,934.

(30) Foreign Application Priority Data

Feb. 15, 2006 (JP) .................................. 2006-038204

(51) Int. Cl.
*H04B 1/38* (2006.01)
(52) U.S. Cl. ....................... 455/90.3; 455/41.3; 358/1.15
(58) Field of Classification Search ............... 455/556.1, 455/557, 90.1–90.3, 41.1–41.3; 358/1.15, 358/500

See application file for complete search history.

(56) References Cited

U.S. PATENT DOCUMENTS

| | | | |
|---|---|---|---|
| 5,669,066 A | 9/1997 | Borg et al. | |
| 5,930,692 A * | 7/1999 | Peterzell et al. | 455/217 |
| 7,039,359 B2 | 5/2006 | Martinez | |
| 2006/0183454 A1* | 8/2006 | Al-Mahdawi | 455/296 |
| 2006/0256378 A1* | 11/2006 | Korst et al. | 358/1.15 |

FOREIGN PATENT DOCUMENTS

| | | |
|---|---|---|
| JP | 62-274820 | 11/1987 |
| JP | 05-129984 | 5/1993 |
| JP | 10-336068 | 12/1998 |
| JP | 11-298366 | 10/1999 |
| JP | 2001-292004 | 10/2001 |
| JP | 2004-336630 | 11/2004 |
| JP | 2005-260816 | 9/2005 |
| JP | 2005-332318 | 12/2005 |

* cited by examiner

*Primary Examiner* — Christian Hannon
(74) *Attorney, Agent, or Firm* — Harness, Dickey & Pierce, P.L.C.

(57) ABSTRACT

An identification information reader includes an antenna commonly used for transmission of a radio wave to a radio frequency identification tag and reception of a radio wave that has been modulated with at least identification information and transmitted from a radio frequency identification tag, a transmitter which outputs a radio wave to be transmitted from the antenna, a receiver which demodulates a radio wave received by the antenna to acquire at least the identification information, a directional coupler which is connected between the transmitter and the receiver, guides the radio wave output from the transmitter to the antenna and guides the radio wave received by the antenna to the receiver, and an attenuator which is connected between the antenna and the directional coupler and attenuates the radio wave guided to the receiver to reduce saturation of the receiver due to an increase in voltage standing wave ratio of the antenna.

6 Claims, 3 Drawing Sheets

IDENTIFICATION INFORMATION READER AND PRINTER INCLUDING THE SAME

CROSS-REFERENCE TO RELATED APPLICATIONS

This is a divisional application of U.S. application Ser. No. 11/706,052 filed Feb. 14, 2007, which is based upon and claims the benefit of priority from prior Japanese Patent Application No. 2006-038204, filed Feb. 15, 2006, the entire contents of which are incorporated herein by reference.

BACKGROUND OF THE INVENTION

1. Field of the Invention

The present invention relates to an identification information reader (interrogator), which performs short-range radio communication with a radio frequency identification (RFID) tag, and also relates to a printer including the identification information reader.

2. Description of the Related Art

"RFID" is a generic term for technologies that use radio waves, i.e., electromagnetic waves, to automatically identify objects. There are several methods of identification, but most of common is to store at least identification information (a serial number or the like) in an RFID tag affixed to an object, and read the identification information from the RFID tag. The RFID tag is an IC tag in which a microchip is associated with an antenna connected thereto to transmit the identification information to, for example, an RFID reader, as a reply to an interrogation from the RFID reader. If the RFID tag is of a passive type which does not have a power supply, it is powered by a radio wave that is, for example, a non-modulated carrier wave transmitted from the RFID reader. The RFID tag performs backscatter modulation, superimposing identification information on the radio wave, and transmits the modulated wave to the RFID reader. If the object approaching the RFID reader is not made of metal, the RFID reader is able to succeed radio communication with the RFID tag buried in the object. Therefore, the RFID tag has been utilized in various fields: distribution management to track down an article distributed through a distribution route and then adjust the production and inventory in accordance with the sales condition; history management to manage histories, such as the details of work performed through the process of distributing the article; and article management to check the whereabouts of an article, e.g., a book on a shelf of a library, which moves due to lending and returning.

Conventionally, a label printer is known, which uses a roll of label tape having a series of label sheets that respectively cover RFID tags arranged in series and are pasted on base paper, each label sheet being detachable from the base paper along with the corresponding RFID tag (for example, see Jpn. Pat. Appln. KOKAI Publication No. 2005-332318). The label printer feeds the label tape in one direction. During the feeding, the label printer performs an operation of printing characters or graphic symbols on the label sheets, and an operation of writing and reading identification data in and from the RFID tag.

The label printer disclosed in Jpn. Pat. Appln. KOKAI Publication No. 2005-332318 includes an RFID reader writer and print mechanism. The RFID reader writer writes identification information in each RFID tag, and reads the written information therefrom. The print mechanism prints characters or graphic symbols on the label sheet corresponding to the RFID tag. The RFID reader writer has a radio-frequency (RF) transmission line for use in both transmission of a radio wave to the RFID tags and reception of a radio wave that has been modulated with at least the identification information and transmitted from the RFID tag. The RFID reader writer also has a transmitter that outputs a radio wave to be transmitted from an antenna, and a receiver that demodulates a radio wave received by the antenna to obtain the identification information. The transmitter is capable of modulating the radio wave with the identification information and outputting the modulated radio wave for transmission from the antenna, as writing of the identification information. When backscatter modulation is carried out in the RFID tag, the single antenna is used to both transmit and receive radio waves of the same frequency, as described above. For this purpose, the RFID reader writer has a directional coupler which guides the radio wave output from the transmitter to the antenna, and guides the radio wave received by the antenna to the receiver. The radio wave guided from the transmitter to the antenna and the radio wave guided from the antenna to the receiver are isolated by the directional coupler. For example, if a circulator is used as the directional coupler, the isolation is set to about 15 to 26 dB, thus preventing a leak of transmission power from the transmitter to the receiver.

The antenna is located on the base paper side opposite to the label sheet side, and adjacent to the print head of the print mechanism and the RFID tag at a distance of several millimeters. Therefore, the voltage standing wave ratio (VSWR) of the antenna increases due to an influence of the print head and the RFID tag, and reduces the isolation in the directional coupler. In other words, due to the increase in VSWR, that is, a decrease in return loss, the transmission power of the radio wave guided from the transmitter to the antenna is significantly reflected by the antenna. In this case, part of the transmission power may be input to the receiver at a high level. If saturation occurs in the receiver by the transmission power, it will be difficult to obtain identification information in demodulation performed by the receiver.

This problem may be solved by antenna matching, which equalizes the antenna impedance of the RFID reader writer with respect to the RFID tag and the characteristic impedance of the radio-frequency transmission line, thereby reducing the VSWR. However, since the antenna shape of the RFID tag and the dielectric constant of the base paper are not standardized, it is not practical to adjust the antenna matching in conformity with them.

BRIEF SUMMARY OF THE INVENTION

An object of the present invention is to provide an identification information reader, which can stably obtain identification information from an RFID tag, without saturation of the receiver due to an increase in voltage standing wave ratio, and also to provide a printer having the identification information reader.

According to a first aspect of the present invention, there is provided an identification information reader comprising: an antenna commonly used for transmission of a radio wave to a radio frequency identification tag and reception of a radio wave that has been modulated with at least identification information and transmitted from a radio frequency identification tag; a transmitter which outputs a radio wave to be transmitted from the antenna; a receiver which demodulates a radio wave received by the antenna to acquire at least the identification information; a directional coupler which is connected between the transmitter and the receiver, guides the radio wave output from the transmitter to the antenna and guides the radio wave received by the antenna to the receiver; and attenuating means, connected between the antenna and the directional coupler, for attenuating the radio wave guided to the receiver to reduce saturation of the receiver due to an increase in voltage standing wave ratio of the antenna.

According to a second aspect of the present invention, there is provided a printer comprising: a print mechanism that performs printing on a print medium, to which a radio frequency identification tag is appended; an identification information reader that performs radio communication with the radio frequency identification tag; and a control circuit that controls the print mechanism and the identification information reader, the identification information reader including: an antenna commonly used for transmission of a radio wave to a radio frequency identification tag and reception of a radio wave that has been modulated with at least identification information and transmitted from a radio frequency identification tag; a transmitter which outputs a radio wave to be transmitted from the antenna; a receiver which demodulates a radio wave received by the antenna to acquire at least the identification information; a directional coupler which is connected between the transmitter and the receiver, guides the radio wave output from the transmitter to the antenna and guides the radio wave received by the antenna to the receiver; and attenuating means, connected between the antenna and the directional coupler, for attenuating the radio wave guided to the receiver to reduce saturation of the receiver due to an increase in voltage standing wave ratio of the antenna.

With the above identification information reader and the printer, the attenuating means is connected between the antenna and the directional coupler, so that the radio wave guided to the receiver is attenuated to reduce saturation of the receiver due to an increase in voltage standing wave ratio of the antenna. As a result, the identification information can stably be obtained from the RFID tag, without saturation of the receiver due to an increase in voltage standing wave ratio.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A label printer according to an embodiment of the present invention will be described below with reference to the accompanying drawings.

Figure 1:
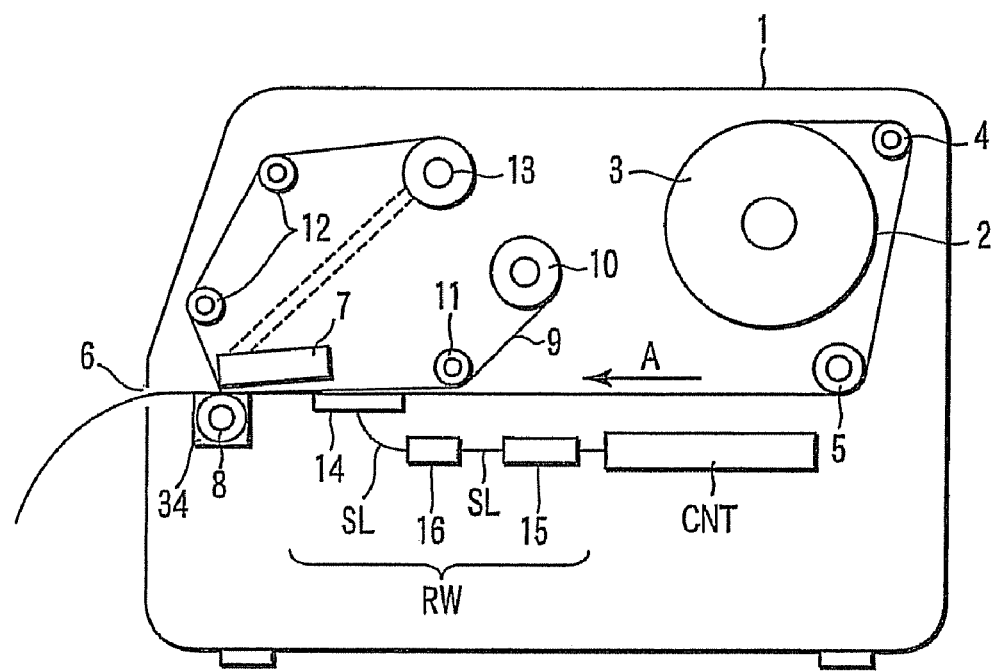
FIG. 1 is a schematic diagram showing the internal structure of a label printer according to an embodiment of the present invention.
Figure 2:
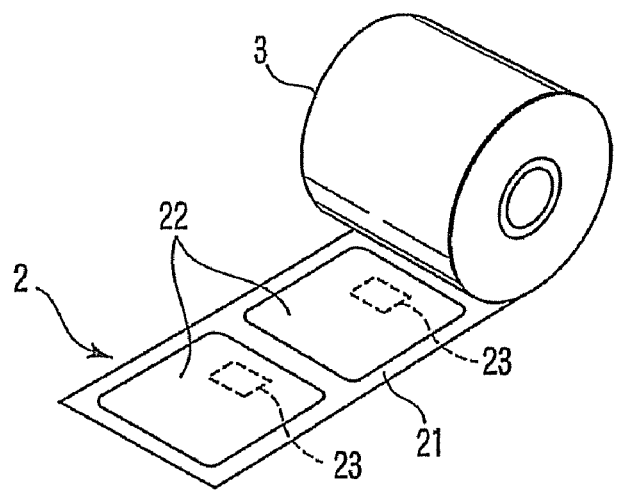
FIG. 2 is a perspective view showing an outer appearance of a label tape used in the label printer shown in FIG. 1.
Figure 3:
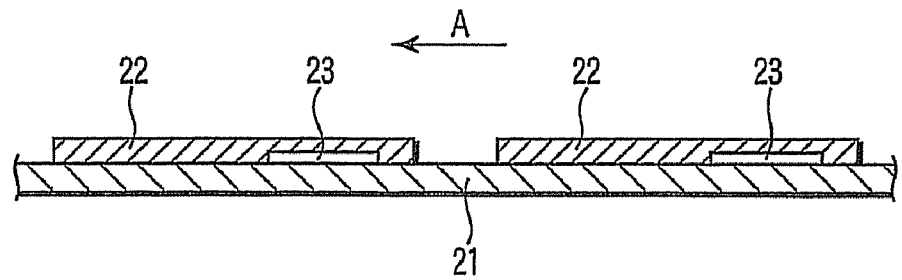
FIG. 3 is a sectional view of the label tape shown in FIG. 2 taken along a feed direction A.

FIG. 1 schematically shows the internal structure of the label printer, FIG. 2 shows an outer appearance of a label tape 2 used in the label printer, and FIG. 3 shows the sectional structure of the label tape 2. In the label printer, the label tape 2 is provided in the form of a roll 3, which can be drawn out, and located at an upper rear portion of a housing 1. The leading edge of the label tape 2 is drawn out and extended through pulleys 4 and 5 to a label issuing port 6.

The label 2 has a structure in which a series of label sheets 22 respectively cover RFID tags 23 arranged in series on base paper 21, which is continuous paper, and pasted on the RFID tags 23 and the base paper 21 with an adhesive. The label sheets 22 are print media having a predetermined size and arranged at regular intervals along the base paper 21. Each of the label sheets 22, together with the corresponding RFID tag 23, can be peeled from the base paper 21.

In proximity to the label issuing port 6, a thermal print head 7 and a platen roller 8 are arranged to face each other with the label tape 2 interposed therebetween. An ink ribbon 9 is provided in the form of a roll 10, which can be drawn out, and located behind the thermal print head 7. The leading edge of the ink ribbon 9 is connected to a take-up reel 13 via a pulley 11, the thermal print head 7 and pulleys 12. When a label is issued, the thermal print head 7 is pressed against the platen roller 8 by, for example, a solenoid or a spring, with the result that the ink ribbon 9 is brought into close contact with the label tape 2. A stepping motor 34 is provided to drive the platen roller 8 and the take-up reel 13. The platen roller 8 rotates counterclockwise to feed the label tape 2 in the feed direction indicated by an arrow A, while the take-up reel 13 rotates clockwise to take up the ink ribbon 9 in accordance with the feed of the label tape 2. The thermal print head 7 is a line head comprising resistance heating elements arranged in a line parallel to the shaft of the platen roller 8. The thermal print head 7 executes printing by selectively heating the heating elements to fuse or sublimate the ink of the ink ribbon 9. The thermal print head 7, a stepping motor 34, the platen roller 8, the ink ribbon 9, the take-up reel 13, and the like described above serve to form a print mechanism PL.

On the roll 3 side of the platen roller 8 opposite to the label issuing port 6, there is an RFID reader writer RW, which performs radio communication with the RFID tag 23 to read and write at least identification information. The RFID reader writer RW is formed of three units of an antenna 14, a reader writer circuit 15 and an attenuator 16. The antenna 14 is separated from the platen roller 8 at a distance that it slightly overlaps the rear part of the thermal print head 7, and setup such that the radiation surface of the antenna 14 is adjacent to the label tape 2. The antenna 14 is commonly used for both transmission of a radio wave to the RFID tag 23 and reception of a radio wave that has been modulated with at least the identification information, as a result of the transmission, and transmitted from the RFID tag 23. The attenuator 16 is connected between the antenna 14 and the reader writer circuit 15, more specifically inserted in the radio-frequency transmission line SL that connect the antenna 14 and the reader writer circuit 15. The RFID tag 23 is an IC tag in which a microchip is associated with an antenna connected thereto to transmit at least the identification information to the RFID reader writer RW, as a reply to an interrogation from the RFID reader writer RW. The microchip has a conventionally known structure, and includes a memory for storing identification information and other information, and a circuit for demodulating and modulating a radio wave. The RFID tag 23 is of, for example, a passive type which does not have a power supply. It is powered by a radio wave that is, for example, a non-modulated carrier wave transmitted from the RFID reader writer RW. The RFID tag 23 performs backscatter modulation, superimposing identification information on the radio wave, and transmits the modulated wave to the RFID reader writer RW. Various methods such as an electromagnetic coupling method, an electromagnetic induction method, a microwave method and the like are applicable to the radio communication between the RFID tag 23 and the RFID reader writer RW.

With this label printer, while the label tape 2 is being fed to the label issuing port 6, the RFID reader writer RW performs writing and reading of at least identification information with respect to the RFID tag 23, and the print mechanism PL performs printing of characters or graphic symbols on the label sheets 22. The label tape 2 is fed in units of label sheet 22 and ejected through the label issuing port 6. Thereafter, each label sheet 22, together with the corresponding RFID tag 23, is peeled from the base paper 21. The label sheet 22 covering the RFID tag 23 is affixed to a product or any other object. As shown in FIG. 3, the label sheets 22 are located on the base paper 21 such that the top and side surfaces of the RFID tags 23 are covered by the label sheets 22, the bottom surfaces of the RFID tags 23 are set in contact with the base paper 21, and each of the RFID tags 23 is assigned to a corresponding one of the label sheets 22.

Figure 4:
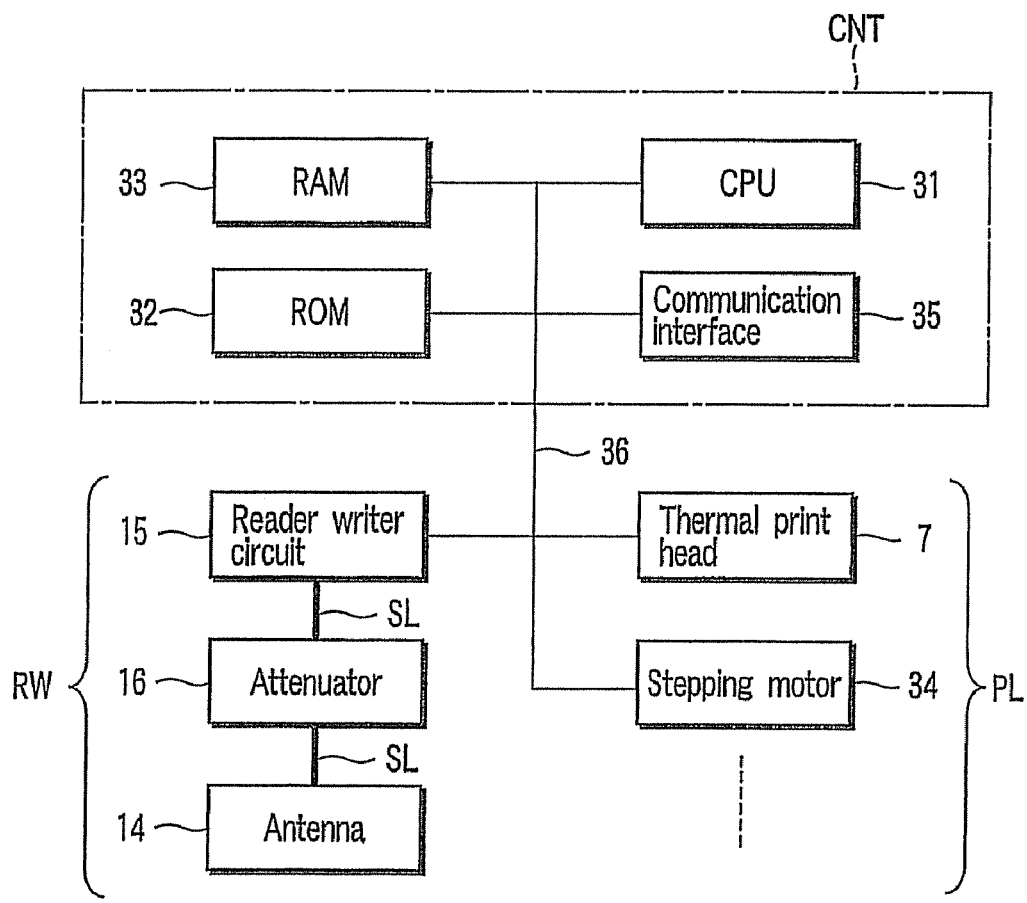
FIG. 4 is a block diagram showing the circuit configuration of the label printer shown in FIG. 1.

FIG. 4 shows the circuit configuration of the label printer including the control circuit CNT, RFID reader writer RW and print mechanism PL. The print mechanism PL and the RFID reader writer RW are controlled by the control circuit CNT. The control circuit CNT includes a central processing unit (CPU) 31, a read only memory (ROM) 32, a random access memory (RAM) 33, a communication interface (I/F) 35 and a bus line 36 connecting these components. The CPU 31 performs various control processing. The ROM 32 holds control program data for the CPU 31, setting data, etc. The RAM 33 temporarily stores data input to and output from the CPU 31. The communication interface 35 performs cable or radio communication with a host apparatus, such as a host computer, to acquire print data to be printed on the label sheets 22, and identification information and other information to be written in the RFID tags 23. The RAM 33 includes areas for storing the print data, the identification information and other information (since the other information is appended to and processed along with the identification information, the description thereof will be omitted). The CPU 31 controls driving of the stepping motor 34 to feed the label tape 2 at a time of issuing labels. The CPU 31 also controls the RFID reader writer RW to write the identification information in the RFID tag 23 and read the information therefrom for confirmation, in the state where the RFID tag 23 covered by the label sheet 22 faces the radiation surface of the antenna 14. Further, the CPU 31 controls the thermal print head 7 to initiate printing of the print data on the label sheet 22 after the label sheet 22 reaches the position of heating elements of the thermal print head 7. The stepping motor 34 and the platen roller 8 serve to form a label tape feeder that feeds the label tape 2 in a sub-scanning direction (the feed direction indicated by the arrow A) perpendicular to a main scanning direction, in which the resistance heating elements of the thermal print head 7 are arranged in a line. Thus, the label tape 2 is drawn out of the roll 3 in accordance with the amount of rotation of the platen roller 8. The take-up reel 13 rotates along with the platen roller 8, with the result that the ink ribbon 9 is drawn out from the roller 10 in accordance with the amount of feed of the label tape 2.

When a label is actually issued, the CPU 31 acquires the identification information to be written in the RFID tag 23 and the print data to be printed on the label sheet 22 from the host apparatus, and temporarily stores them in the RAM 33. Then, the CPU 31 permits feeding of the label tape 2. The CPU 31 reads the identification information from the RAM 33 and outputs it to the reader writer circuit 15 of the RFID reader writer RW, before the RFID tag 23 covered with the label sheet 22 passes over the antenna 14. In order to write the identification information on the RFID tag 23, the reader writer circuit 15 first transmits a radio wave, which is a non-modulated carrier wave (radio frequency signal), from the antenna 14 to the RFID tag 23. Thereafter, the reader writer circuit 15 transmits a radio wave, which is a carrier wave modulated with the identification information, from the antenna 14 to the RFID tag 23. Further, to read the identification information from the RFID tag 23, the reader writer circuit 15 transmits a radio wave, which is a non-modulated carrier wave (radio-frequency signal) from the antenna 14 to the RFID tag 23.

The RFID tag 23 receives the radio wave, which is the non-modulated carrier wave transmitted from the antenna 14 of the RFID reader writer RW, and is activated in response to the interrogation by this radio wave. To be precise, the received radio wave is used as power to make the RFID tag 23 operable, regardless of whether it has been modulated or non-modulated. After the activation, the RFID tag 23 demodulates the radio wave. When identification information is acquired as a result of the demodulation, it is stored in the memory. Thereafter, the RFID tag 23 again receives a radio wave, that is a non-modulated carrier wave. Accordingly, the RFID tag 23 performs backscatter modulation to superimpose the identification information from the memory on the non-modulated carrier wave, and transmits the backscatter-modulated radio wave to the RFID reader writer RW.

The backscatter-modulated radio wave is received by the antenna 14 of the RFID reader writer RW and input to the reader writer circuit 15. The reader writer circuit 15 demodulates the radio wave to confirm the identification information as a result of the writing. If there is an error in the result of the writing, the reader writer circuit 15 executes the above operation again. The leading edge of the label sheet 22 reaches a print position where the resistance heating elements of the thermal print head 7 face the platen roller 8, after the identification information is correctly written in the RFID tag 23.

After the leading edge of the label sheet 22 reaches the print position, the CPU 31 controls the thermal print head 7 to be driven in accordance with the print data. In the thermal print head 7, the line of resistance heating elements are selectively energized for heating. As a result, a printing operation using the ink ribbon is performed. The selective energization for heating is executed each time the label sheet 22 moves in the sub-scanning direction at a line pitch of the resistance heating elements. The CPU 31 checks the label position in the sub-scanning direction by counting the number of drive pulses transmitted to the stepping motor 34 that rotates the platen roller 8. Printing of the print data completes before the rear edge of the label sheet 22 passes the print position.

Figure 5:
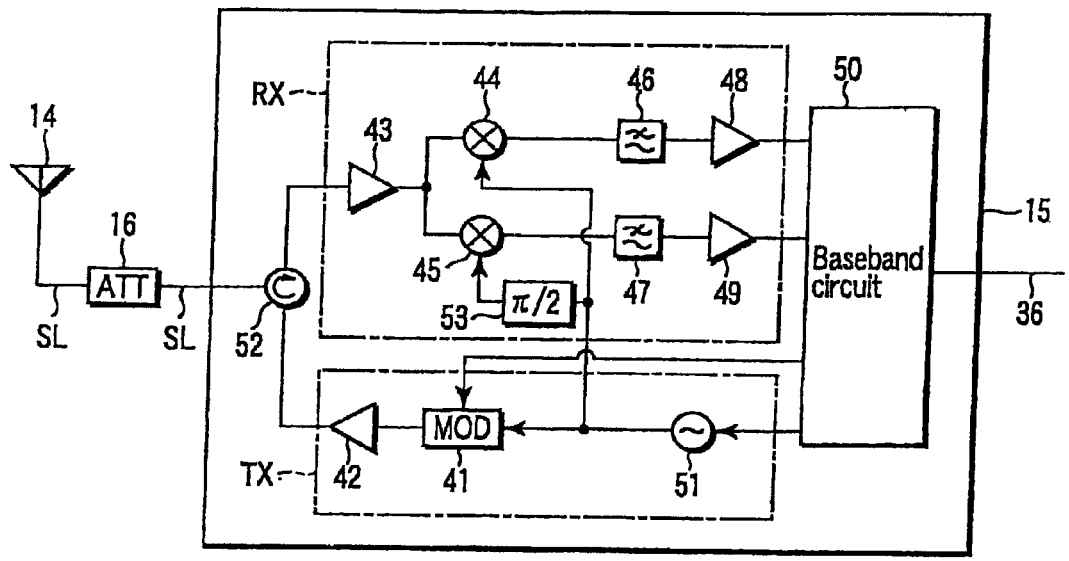
FIG. 5 is a block diagram showing the detailed configuration of a RFID reader writer shown in FIG. 4.

FIG. 5 shows the detailed configuration of the RFID reader writer RW. In the RFID reader writer RW, the reader writer circuit 15 includes: a transmitter TX which outputs a radio wave to be transmitted from the antenna 14; a receiver RX which demodulates a radio wave received by the antenna 14 to acquire at least identification information; a directional coupler 52 which is connected between the transmitter TX and the receiver RX, guides the radio wave output from the transmitter TX to the antenna 14 and guides the radio wave received by the antenna 14 to the receiver RX; and a baseband circuit 50 which controls the transmitter TX and the receiver RX. As shown in FIG. 5, the attenuator 16 is connected between the antenna 14 and the directional coupler 52, and has a function for attenuating the radio wave guided to the receiver RX to reduce saturation of the receiver RX due to an increase in voltage standing wave ratio of the antenna 14. The directional coupler 52 is made of, for example, a circulator, a hybrid coupler or a power divider. The transmitter TX includes a modulator 41, a power amplifier 42, and a local oscillator 51. The receiver RX includes a low-noise amplifier 43, first and second mixers (frequency converters) 44 and 45, first and second low-pass filters 46 and 47, and first and second low-frequency amplifiers 48 and 49.

The local oscillator 51 generates a high-frequency signal used as a carrier wave for the radio wave transmitted and received via the antenna 14. Under the control of the baseband circuit 50, the oscillation frequency of the local oscillator 51 is adjustable as the carrier frequency of the radio wave transmitted and received via the antenna 14. The local oscillator 51 is connected to the modulator 41 and the first and second mixers 44 and 45 to supply high-frequency signals thereto. A $\pi/2$ phase shifter 53 is inserted between the local oscillator 51 and the second mixer 45. With this configuration, the high-frequency signal input to the second mixer 45 has a phase difference of 90° relative to the high-frequency signal input to the first mixer 44. The modulator 41 is provided to modulate the carrier wave, which is a high-frequency signal, generated from the local oscillator 51, and supply it to the power amplifier 42. At a time of writing the identification information in the RFID tag 23, the carrier wave is modulated with the identification information supplied in the form of a baseband signal from the baseband circuit 50 to the modulator 41. The modulated wave is output as a radio wave to be transmitted to the RFID tag 23. When the identification information is not supplied from the baseband circuit 50, the carrier wave, which is non-modulated, is output as a radio wave to be transmitted to the RFID tag 23. The radio wave is power-amplified by the power amplifier 42 and supplied to the directional coupler 52. The directional coupler 52 guides the radio wave to the antenna 14 via the attenuator 16. The antenna 14 radiates the radio wave in space to transmit it to the RFID tag 23.

The antenna 14 receives a radio wave, which has been backscatter-modulated by the RFID tag 23. The directional coupler 52 guides the radio wave received by the antenna 14 to the low-noise amplifier 43 through the attenuator 16. The low-noise amplifier 43 amplifies the radio wave and supplies it to the first and second mixers 44 and 45. The first mixer 44 mixes the radio wave output from the low-noise amplifier 43 with the high-frequency signal output from the local oscillator 51 as a carrier component of the radio wave, and outputs an in-phase baseband signal obtained as a result of the mixing. At the first low-pass filter 46, a noise component of an unnecessary frequency band is removed from the in-phase baseband signal. Then, the in-phase baseband signal is amplified by the first low-frequency amplifier 48, and supplied to the baseband circuit 50. The second mixer 45 mixes the radio wave output from the low-noise amplifier 43 with a high-frequency signal, which has been output from the local oscillator 51 as a carrier component of the radio wave and given the phase difference of 90° by the phase shifter 53, and outputs a quadrature-phase baseband signal as a result of the mixing. At the second low-pass filter 47, a noise component of an unnecessary frequency band is removed from the quadrature-phase baseband signal. Then, the quadrature-phase baseband signal is amplified by the second low-frequency amplifier 49, and supplied to the baseband circuit 50. The baseband circuit 50 performs a demodulation process to acquire the identification information from the in-phase baseband signal and the quadrature-phase baseband signal.

The attenuator 16 is provided to prevent the VSWR of the antenna 14 from increasing. It preferably has an attenuation set in advance to about 1 to 3 dB. However, the attenuation may be greater, as far as the power consumption and the heat value of the reader writer circuit 15 are permitted.

The following is a description of the VSWR of the antenna 14, which is obtained in the case where the directional coupler 52 is made of a circulator. The voltage standing wave ratio (VSWR) is expressed by the following equation (1), where $\gamma$ represents the reflection coefficient of the antenna 14:

$$VSWR=(1+\gamma)/(1-\gamma) \qquad (1).$$

In this case, the return loss RL is expressed by the following equation (2):

$$RL(dB)=-20\cdot\log\gamma=-10(Pr/Pf) \qquad (2)$$

where Pr represents reflected wave power, and Pf represents progressive wave power.

When the antenna 14 with the VSWR adjusted to, for example, 1.0 is connected to the reader writer circuit 15, if the isolation of the directional coupler (circulator) 52 is 25 dB and the output of the power amplifier 42 is 500 mW (27 dBm), power of 2 dBm is input to the low-noise amplifier 43. The low-noise amplifier in general can amplify such a level of power without distortion.

However, since the user of the label printer may employ various types of the label tape 2 which differ in materials or shapes and are selectable for a desired purpose, the voltage standing wave ratio (VSWR) obtained when the label tape 2 is close to the antenna 14 may become, for example, 3. In this case, the return loss RL is about 6 dB according to the equation (2). If the insertion loss in the directional coupler 52 is 0.5 dB, the power amplified by the power amplifier 42 is reflected by the antenna 14 and power of 20 dBm is input to the low-noise amplifier 43.

If high power of 20 dBm is input to the general low-noise amplifier 43, the amplifier will be saturated and the reception sensitivity will be lowered. The RFID reader writer RW may have a configuration without a low-noise amplifier, in which case power is directly input to the mixers. The mixers in general are also saturated when they receive power of 20 dBm. Depending on the type of the label tape 2, the voltage standing wave ratio (VSWR) may be 3 or more. At the worst, in that case, the low-nose amplifier 43 may be broken.

To avoid this, if the attenuator 16 of 3 dB is inserted between the antenna 14 and the directional coupler (circulator) 52, the return loss RL is improved by 6 dB. Therefore, power of 14 dBm is input to the low-noise amplifier 43 and the saturation is reduced. At this time, the power radiated in space from the antenna 14 is also attenuated by 3 dB. However, since the distance between the RFID tag 23 and the antenna 14 is short, there is substantially no influence on the radio communication.

As described above, the return loss RL of the antenna 14 can be improved by providing the attenuator 16 connected between the antenna 14 and the directional coupler (circulator) 52, even if the voltage standing wave ratio of the antenna 14 increases. Therefore, the RFID reader writer RW can read the identification information always stably from the RFID tag 23, avoiding the saturation of the low-noise amplifier 43. The attenuator 16 may be formed of a coaxial cable or the like, whose power loss is high.

It is preferable that the attenuation ATT (dB) of the attenuator 16 satisfies the following relational expression (3):

$$ATT \geq (IS-IL1-IL2-RL)/2 \qquad (3)$$

where IS (dB) represents an isolation between transmitter and receiver ends of the directional coupler 52, IL1 (dB) represents an insertion loss that occurs in the directional coupler 52 with respect to the radio wave guided from the transmitter TX to the antenna 14, IL2 (dB) represents an insertion loss that occurs in the directional coupler 52 with respect to the radio wave guided from the antenna 14 to the receiver RX, and RL (dB) represents a return loss of the antenna 14.

When the above relational expression (3) is satisfied, power P2 that is output from the power amplifier 42, reflected by the antenna 14 and reaches the low-noise amplifier 43 is smaller than power P1 that is output from the power amplifier 42, passes through the directional coupler 52 and reaches the low-noise amplifier 43. Therefore, the low-noise amplifier 43 will not be saturated, even if the voltage standing wave ratio of the antenna 14 increases. Consequently, the receiver RX can perform a satisfactory receiving operation.

Figure 6:
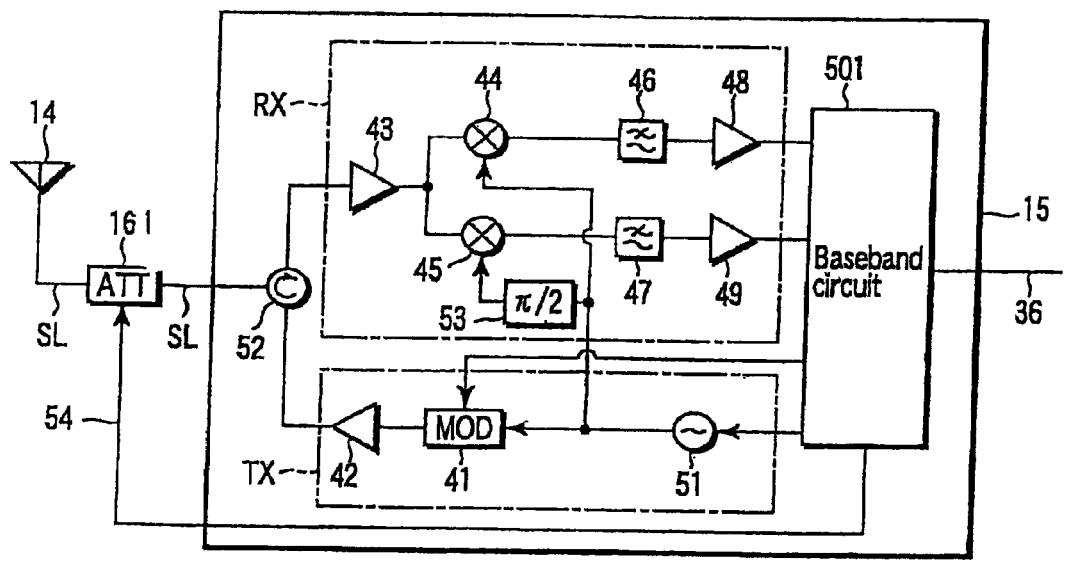
FIG. 6 is a block diagram showing a modification of the RFID reader writer shown in FIG. 5.

FIG. 6 shows a modification of the RFID reader writer RW shown in FIG. 5. In FIG. 6, the same parts as those shown in FIG. 5 are identified by the same reference symbols as those used in FIG. 5, and detailed descriptions thereof will be omitted. In the label printer, the type of the label tape 2 is one of the factors that change the communication environment. Therefore, more appropriate radio communication can be achieved by using a sensor for detecting a change in communication environment, for example, a roll change of the label tape 2, and notifying the RFID reader writer RW of the change in communication environment by the CPU 31. In this modification, a variable attenuator 161, instead of the attenuator 16 shown in FIG. 5, is inserted in the radio-frequency transmission line SL between the antenna 14 and the directional coupler 52, and the base band circuit 50 is connected to the attenuator 161 through a control line 54 to supply an attenuation control signal. The attenuation of the variable attenuator 161 is adjusted by the attenuation control signal in units of 1 dB in a range of, for example, from 0 to 10 dB. The baseband circuit 50 is configured to perform an adjustment operation to adjust the attenuation of the attenuator 161 when a change in communication environment is detected, in addition to the operations described above with reference to FIG. 5.

In an actual adjustment operation, the attenuation of the attenuator 161 is initially set to 0 dB. In this state, the identification information is written in and read from the RFID tag 23. If reading of the identification information is unsuccessful, it is assumed that an abnormal condition occurs in the radio communication. Therefore, the baseband circuit 50 repeats writing and reading of the identification information, while the attenuation of the variable attenuator 161 is successively increased from 0 dB to 10 dB. As a result of the repetition, it finally sets a specific attenuation, at which successful and stable reading of the identification information is achieved, to the variable attenuator 161.

The attenuation control signal may be supplied to the variable attenuator 161 from another circuit independent of the baseband circuit 50. Further, the range of attenuation or the unit of adjustment of the variable attenuator 161 may be changed arbitrarily.

With the configuration of the modification, the attenuation of the attenuator 161 can be suitably set with respect to various materials of the label tape 2. Therefore, regardless of what kind of the label tape 2 is used, the return loss RL of the antenna 14 is improved as well as in the case described above with reference to FIG. 5, even if the voltage standing wave ratio of the antenna 14 increases. Consequently, the low-noise amplifier 43 is prevented from being saturated, so that the RFID reader writer RW can stably acquire identification information of the RFID tag 23.

In the embodiment described above, the attenuator 16 or 161 is inserted between the directional coupler 52 (circulator) and the antenna 14. With this configuration, even if the attenuator 16 or 161 is small, it is possible to avoid reflection of transmission power caused by an impedance mismatch of the antenna 14. This provides an advantage that a leak of the transmission power to the receiver RX can be prevented without lowering the reception sensitivity.

The present invention is not limited to the above embodiment, but can be variously modified within the scope of the invention.

Since the above embodiment is a label printer, the RFID reader writer RW is configured to perform short-range radio communication with the RFID tag 23 to write and read at least identification information. However, the present invention can be applied to an RFID reader (interrogator), which performs short-range radio communication with the RFID tag 23 to read at least identification information. In the RFID reader also, it is necessary to transmit a radio wave, i.e., a non-modulated carrier wave, to the RFID tag 23, backscatter-modulate the radio wave with at least the identification information, and receive the radio wave transmitted from the RFID tag 23. Therefore, in the caser where the RFID reader includes: an antenna 14 commonly used for both transmission of a radio wave to the RFID tag 23 and reception of a radio wave that has been modulated with at least the identification information and transmitted from the RFID tag 23; a transmitter TX which outputs a radio wave to be transmitted from the antenna 14; a receiver RX which demodulates a radio wave received by the antenna 14 to acquire at least the identification information; a directional coupler 52 which is connected between the transmitter TX and the receiver RX, guides the radio wave output from the transmitter TX to the antenna 14 and guides the radio wave received by the antenna 14 to the receiver RX, it is effective that the RFID reader comprises attenuating means, connected between the antenna 14 and the directional coupler 52, for attenuating the radio wave guided to the receiver RX to reduce saturation of the receiver RX due to an increase in voltage standing wave ratio of the antenna 14. The attenuating means is described as the attenuator 16 or the variable attenuator 161 in the embodiment and modification described above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A printer comprising:
   a print mechanism that performs printing on a print medium, to which a radio frequency identification tag is appended;
   an identification information reader that performs radio communication with the radio frequency identification tag; and
   a control circuit that controls the print mechanism and the identification information reader;
   wherein the identification information reader includes:
      an antenna commonly used for transmission of a radio wave to a radio frequency identification tag and reception of a radio wave that has been modulated with at least identification information and transmitted from a radio frequency identification tag;

a transmitter which outputs a radio wave to be transmitted from the antenna;

a receiver which demodulates a radio wave received by the antenna to acquire at least the identification information;

a directional coupler which is connected between the transmitter and the receiver, guides the radio wave output from the transmitter to the antenna and guides the radio wave received by the antenna to the receiver; and attenuating means, connected between the antenna and the directional coupler, for attenuating the radio wave guided to the receiver to reduce saturation of the receiver due to an increase in voltage standing wave ratio of the antenna;

wherein the antenna is located in proximity to the print mechanism; and wherein the attenuation ATT (dB) of the attenuating means satisfies:

$$ATT \geq (IS-IL1-IL2-RL)/2$$

where IS (dB) represents an isolation between transmitter and receiver ends of the directional coupler, IL1 (dB) represents an insertion loss that occurs in the directional coupler with respect to the radio wave guided from the transmitter to the antenna, IL2 (dB) represents an insertion loss that occurs in the directional coupler with respect to the radio wave guided from the antenna to the receiver, and RL (dB) represents a return loss of the antenna.

2. The printer according to claim 1, wherein the receiver includes a low-noise amplifier and a low-pass filter.

3. The printer according to claim 1, wherein the directional coupler is a circulator.

4. The printer according to claim 1, wherein the attenuating means comprises a variable attenuator, attenuation of which is adjusted according to a change in communication environment.

5. The printer according to claim 1, wherein the transmitter is configured to output a radio wave modulated with at least the identification information, which is to be written in the radio identification tag.

6. A printer comprising:

a print mechanism that performs printing on a print medium, to which a radio frequency identification tag is appended;

an identification information reader that performs radio communication with the radio frequency identification tag; and a control circuit that controls the print mechanism and the identification information reader;

wherein the identification information reader includes:

an antenna commonly used for transmission of a radio wave to a radio frequency identification tag and reception of a radio wave that has been modulated with at least identification information and transmitted from a radio frequency identification tag;

a transmitter which outputs a radio wave to be transmitted from the antenna;

a receiver which demodulates a radio wave received by the antenna to acquire at least the identification information;

a directional coupler which is connected between the transmitter and the receiver, guides the radio wave output from the transmitter to the antenna and guides the radio wave received by the antenna to the receiver; and an attenuator which is connected between the antenna and the directional coupler, and attenuates the radio wave guided to the receiver to reduce saturation of the receiver due to an increase in voltage standing wave ratio of the antenna;

wherein the attenuation ATT (dB) of the attenuator satisfies:

$$ATT \geq (IS-IL1-IL2-RL)/2$$

where IS (dB) represents an isolation between transmitter and receiver ends of the directional coupler, IL1 (dB) represents an insertion loss that occurs in the directional coupler with respect to the radio wave guided from the transmitter to the antenna, IL2 (dB) represents an insertion loss that occurs in the directional coupler with respect to the radio wave guided from the antenna to the receiver, and RL (dB) represents a return loss of the antenna.

* * * * *